United States Patent

Ogura et al.

Patent Number: 6,037,929
Date of Patent: *Mar. 14, 2000

[54] COORDINATE INPUT SYSTEM AND METHOD OF CONTROLLING SAME

[75] Inventors: Tsuyoshi Ogura; Akihisa Itoh, both of Fukushima-ken, Japan

[73] Assignee: Alps Electric Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/914,430

[22] Filed: Aug. 19, 1997

[30] Foreign Application Priority Data

Aug. 30, 1996 [JP] Japan .................................. 8-248987

[51] Int. Cl.⁷ ...................................................... G09G 5/00
[52] U.S. Cl. ............................................. 345/168; 345/173
[58] Field of Search ..................................... 345/156, 168, 345/173, 157; 178/18.01, 18.03

[56] References Cited

U.S. PATENT DOCUMENTS

| | | | |
|---|---|---|---|
| 5,231,380 | 7/1993 | Logan | 345/156 |
| 5,469,194 | 11/1995 | Clark et al. | 345/173 |
| 5,583,539 | 12/1996 | Hiketa et al. | 345/173 |
| 5,666,113 | 9/1997 | Logan | 345/157 |
| 5,681,220 | 10/1997 | Bertram et al. | 345/173 |
| 5,748,512 | 5/1998 | Vargas | 345/173 |
| 5,757,363 | 5/1998 | Oishi et al. | 345/173 |

*Primary Examiner*—Amare Mengistu
*Attorney, Agent, or Firm*—Brinks Hofer Gilson & Lione

[57] ABSTRACT

Disclosed are a coordinate input system and a method of controlling the coordinate input system, which can protect work of a user under progress against troubles even when the user touch an operating surface of a pad by mistake during key input operation on a keyboard. When the user operates a coordinate detecting device (PD) such as a pad, the operating action is sent to a coordinate outputting device (PC) such as a personal computer and analyzed by a data analyzer (12). If the user enters key inputs through a keyboard (19), a controller (15) instructs a mode converter (13) not to inform the operating action detected and sent from the data analyzer (12). After that, the controller (15) clears a timer built in a measuring unit (14) each time an key input is entered. Subsequently, if the key input operation is stopped, the measuring unit (14) actually starts counting of the timer. If the timer value exceeds a certain threshold, this is informed to the controller (15). In response to this notice, the controller (15) instructs the mode converter (13) to resume notice of the operating action detected and sent from the data analyzer (12).

5 Claims, 4 Drawing Sheets

COORDINATE INPUT SYSTEM AND METHOD OF CONTROLLING SAME

BACKGROUND OF THE INVENTION

1. Field of the Invention

The present invention relates to a coordinate input system for use in operating a cursor or window on the screen, and a method of controlling the coordinate input system.

2. Description of the Related Art

Heretofore, mouses and track balls have been generally used as pointing devices connected to computers. In addition, other types of pointing devices called pads, touch pads, track pads, etc. have also been employed recently.

In practical use, those pads are built in portable personal computers (so-called note type personal computers), in embedded conventional keyboards, or externally connected to desk top computers. Because of not requiring to be moved in themselves unlike mouses, those pads have a feature that they can be operated without problems even in a limited space on a desk or the like.

To move a cursor (or also called a pointer) on the display screen of a computer by using such a pad, it is only required for a user to put a finger on a flat operating surface several centimeters square provided on the pad and then slide the finger while keeping contact with the operating surface. Similarly to a mouse, a pad includes a left button and a right button. In addition, as with the case of clicking the left button, various operations such as selecting and moving an object displayed on the screen, for example, an icon (i.e., a symbol pattern representing the function of an application program) or a window (i.e., any of multiple independent screens indicated on a display), can also be performed by softly tapping the operating surface with a finger.

An action of carrying out those operations in such a manner is here called "tap (action)" or "tapping". By utilizing the above tap function, a pad makes it possible with one finger to perform not only the above-stated operation equivalent to clicking of the left button, but also other operations equivalent to double clicking of the left button (used to, e.g., start up an application program), in which the left button is clicked twice successively, and dragging to move an object displayed on the screen, such as an icon or window, from one position to another desired position on the screen.

Meanwhile, when pads are embedded in conventional keyboards, an operating surface is arranged, for example, adjacent cursor moving keys (arrow keys) on the side nearer to the user. Also, when pads are built in note type personal computers, an operating surface is arranged in a space adjacent a keyboard on the side nearer to the user where fingers of the user are placed. In other words, the operating surface of a pad and the keys of a keyboard are arranged in fairly close relation, and this arrangement increases a possibility that the user may touch the operating surface of the pad by mistake during the key input operation.

Because such a false operation is regarded as a tap action by the computer, there occur troubles in work of the user under progress. Suppose, for example, that the user starts up a word processor and operates keys to make a composition in Japanese, if the tap action is performed before the key input operation is not yet completed, input letters are settled as they are without undergoing processing for conversion from kana (Japanese syllabic alphabet) into kanji (Chinese characters). Although the user intends to, for example, input a word "けいさんき (computer in kana)" and convert it into "計算機 (computer in kanji)", "けいさんき" in kana is settled on the screen as it is without being converted from kana to kanji.

SUMMARY OF THE INVENTION

In view of the state of art explained above, an object of the present invention is to provide a coordinate input system and a method of controlling the coordinate input system, which can protect work of users under progress against troubles even when the users touch an operating surface of a pad by mistake during key input operation on a keyboard.

To achieve the above object, according to a first aspect of the present invention, a coordinate input system comprises a keyboard operated by a coordinate indicator, a key operation detecting means for detecting key operation made on the keyboard, an operating surface which is disposed near the keyboard and on which the coordinate indicator is operated, operating action detecting means for detecting an operating action performed on the operating surface, screen operating means for carrying out screen operation corresponding to the key operation and the operating action, and control means for inhibiting the screen operation corresponding to the operating action while the key operation is being detected.

According to a second aspect of the present invention, in the coordinate input system of the first aspect, the control means starts a process of inhibiting the screen operation at the time when the key operation is detected, and terminates the inhibiting process after a predetermined period of time elapses from the time when the key operation has no longer been detected.

According to a third aspect of the present invention, in the coordinate input system of the second aspect, the predetermined period of time is variable by setting from the outside.

According to a fourth aspect of the present invention, in a method of controlling a coordinate input system comprising at least a keyboard operated by a coordinate indicator, a key operation detecting means for detecting key operation made on the keyboard, an operating surface which is disposed near the keyboard and on which the coordinate indicator is operated, operating action detecting means for detecting an operating action performed on the operating surface, and screen operating means for carrying out screen operation corresponding to the key operation and the operating action, the screen operation being performed in accordance with operation made on the operating surface and the keyboard, the method comprises a first step of inhibiting the screen operation corresponding to the operating action on the operating surface from the time when the key operation is detected by the key operation detecting means, and a second step of detecting that the key operation is not made for a predetermined period of time after shifting to the first step, and resuming the screen operation corresponding to the operating action on the operating surface.

DESCRIPTION OF THE PREFERRED EMBODIMENT

One embodiment of the present invention will be described hereunder with reference to the drawings.

Figure 1:
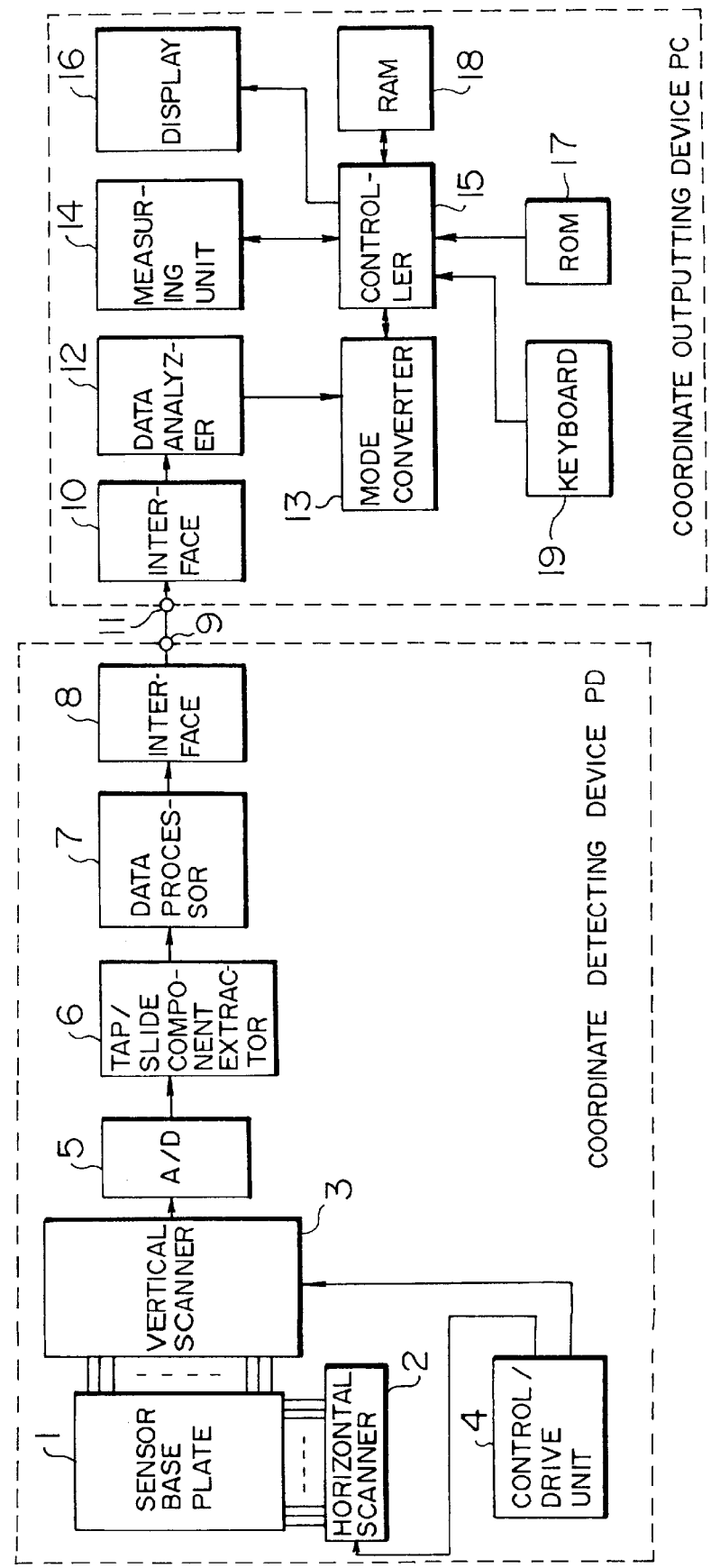
FIG. 1 is a block diagram showing a configuration of a coordinate input system according to one embodiment of the present invention.

Of the drawings, FIG. 1 is a block diagram showing a configuration of a coordinate input system according to this embodiment. As shown in FIG. 1, the coordinate input system mainly comprises two devices, i.e., a coordinate detecting device PD and a coordinate outputting device PC. The coordinate detecting device PD is, for example, a pad such as described above and the coordinate outputting device PC is, for example, a personal computer to which the pad is connected.

Figure 2:
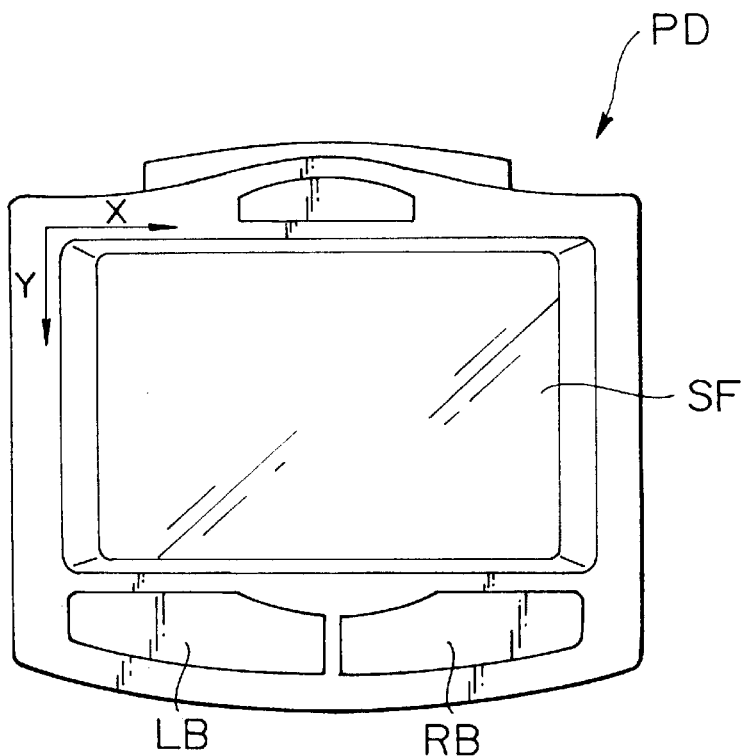
FIG. 2 is a top plan view showing an appearance of a coordinate detecting device PD according to the embodiment.

First, prior to describing various components of the coordinate detecting device PD, a mechanical configuration of the coordinate detecting device PD will be described in brief. FIG. 2 is a top plan view showing an appearance of the coordinate detecting device PD. A left button LB and a right button RB correspond to a left button and a right button of a mouse, respectively, and have the same functions as the corresponding buttons of the mouse. Also, a rectangular area denoted by reference characters SF represents an operating surface on which a coordinate indicator (not shown in FIG. 2) is operated. Note that the coordinate indicator used herein is a user's finger, for example, and the coordinate indicator means a finger F in the following description.

A sensor base plate 1 shown in FIG. 1 is provided under the operating surface SF and includes a plurality of horizontal scan lines (extending in the direction of an X-axis in FIG. 2) and a plurality of vertical scan lines (extending in the direction of a Y-axis in FIG. 2) formed thereon in a matrix pattern so that values of currents flowing through the scan lines are changed upon the finger F touching the operating surface SF. More specifically, the coordinate detecting device PD in this embodiment employs a tablet of electrostatic capacity type that electrodes in a matrix pattern are provided on each of front and rear sides of an electrostatic film and pulses are applied from one end of the electrostatic film to form an electric field. With this arrangement, when the finger is brought into contact with the electrostatic film through the operating surface SF, the electrostatic capacity in the contact portion is reduced. Therefore, the position of the contact portion where the finger touches the operating surface is detected by converting a change in the electrostatic capacity into changes in the current values. Thus, the coordinate position of the contact portion is designated by an intersect point between one horizontal scan line and one vertical scan line.

On the other hand, the above-explained tapping or tap action can be detected by detecting that the finger is lifted off from the operating surface SF immediately after touching it. Furthermore, sliding of the finger on the operating surface SF can also be detected by calculating a change in position of the finger contact portion.

Incidentally, the coordinate detecting device PD is not necessarily of electrostatic capacity type, but may be of pressure sensitive type, for example.

Then, a horizontal scanner 2 is a circuit which is used for horizontal scan of the sensor base plate 1 and has a multiplicity of signal output terminals connected to the horizontal scan lines of the sensor base plate 1.

A vertical scanner 3 is a circuit which is used for vertical scan of the sensor base plate 1, has a multiplicity of signal input terminals connected to the vertical scan lines of the sensor base plate 1, and generates a serial detection signal representing a scan action of the finger.

The serial detection signal includes a tap component produced when the finger is tapped on the operating surface SF of the sensor base plate 1, and a slide component produced when the finger is slid on the operating surface SF. Here, the tap component includes an address component indicating the position where the finger contacts the operating surface SF, and the slide component includes address components indicating from which position the finger has slid to which position on the operating surface SF.

A control/drive unit 4 supplies respective scan driving signals to the horizontal scanner 2 and the vertical scanner 3 for driving the horizontal scanner 2 and the vertical scanner 3.

An A/D (analog/digital) converter 5 converts the serial detection signal produced by the vertical scanner 3 into a digital signal.

A tap/slide component extractor 6 extracts the tap and slide components from the serial detection signal converted into the digital signal, and carries out conversion into three-dimensional coordinate values after separating the tap and slide components from each other. The three-dimensional coordinate values are then output along with the tap and slide components.

Based on the three-dimensional coordinate values sent from the tap/slide component extractor 6, a data processor 7 determines whether the tap action has been executed or not. At the same time, the data processor 7 removes noise from the slide component and transforms through correction a change in position of the finger on a two-dimensional coordinate system of the operating surface SF, which is made up of X-/Y-axes, into a smooth straight or curved line.

An interface 8 is a circuit for transferring data between the coordinate detecting device PD and the coordinate outputting device PC. Based on the information sent from the data processor 7, the interface 8 adds information about tap-on/off and information about turning-on/off of each of the left button LB and the right button RB for each of the corrected absolute coordinate positions (X, Y) on the two-dimensional coordinate system of the operating surface SF. These items of information are then delivered to an output port 9 along with the tap and slide components.

Various components of the coordinate outputting device PC will now be described.

First, an interface 10 is a circuit for transferring data between the coordinate outputting device PC and the coordinate detecting device PD, and receives the above-stated items of information through an input port 11. Note that if the coordinate outputting device PC is a personal computer, the interface 10 and the input port 11 correspond to a known serial port or mouse port.

A data analyzer 12 takes in through the interface 10 the items of information sent from the side of the coordinate detecting device PD, and detects not only click actions of the left and right buttons, but also a tap action, a drag action, a slide action, etc. on the operating surface SF made by the user from the button-on/off information, the tap-on/off information, and so forth. Then, the data analyzer 12 supplies a detected result to a mode converter 13 along with the tap and slide components.

In principle, the mode converter 13 transmits the detected result and the tap and slide components, which are sent from the data analyzer 12, to a controller 15 as they are. Here, the mode converter 13 has a function of enabling/disabling the tap function (i.e., making effective or ineffective the tap action performed by the user), and also has a flag indicating whether the tap function is to be enabled or disabled. In the case of the flag indicating that the tap function is to be disabled, even when the data analyzer 12 detects the tap action, the mode converter 13 ignores the detected result of the data analyzer 12 and does not transmit the detected result to the controller 15.

The flag is rewritten by the mode converter 13 in accordance with an instruction from the controller 15. Also, immediately after the coordinate outputting device PC is supplied with power or reset, the flag is set to enable the tap function.

A measuring unit 14 is a time counting circuit which is similar to a timer built in a personal computer and clears the timer value upon an instruction from the controller 15, followed by starting to count time again. Also, the measuring unit 14 stores therein a threshold described below. More specifically, in this embodiment, when the user performs key input operation, the mode converter 13 makes the tap function disabled in accordance with an instruction from the controller 15, while the measuring unit 14 clears the timer value in accordance with an instruction from the controller 15 and starts to count time again. Unless any key input is entered for a predetermined period of time in the above condition, a mode of disabling the tap function is ended. The above threshold means such a predetermined period of time. Further, the measuring unit 14 has a function of comparing the timer value with the threshold, and at the time when the timer value exceeds the threshold, it informs the controller 15 of the above fact. Correspondingly, the controller 15 instructs the mode converter 13 to restore the flag automatically from the state of indicating the tap function to be disabled to the state of indicating the tap function to be enabled.

The above threshold is set to, e.g., one second as a standard value. But since the threshold largely depends on a typing speed of the user, the user can step wisely adjust the threshold value in the range of about 0.5 to 3 seconds through a known process using a setting window, for example. It is thus possible for the user to set the threshold after actually trying the coordinate input system and to adjust the appropriate threshold step by step with improved skill of typing.

The controller 15 is a circuit for supervising the components of the coordinate outputting device PC except the interface 10 and the data analyzer 12. Functions of the controller 15 will be described in detail in the following explanation of the operation.

The display 16 comprises a display device of a personal computer, for example, and indicates various images, including a window and cursor, on the screen of the display device in accordance with instructions from the controller 15.

A ROM (Read Only Memory) 17 stores therein operating programs for the controller 15, etc.

A RAM (Random Access Memory) 18 is a memory circuit for temporarily storing data when the controller 15 executes various processing steps.

Figure 3:
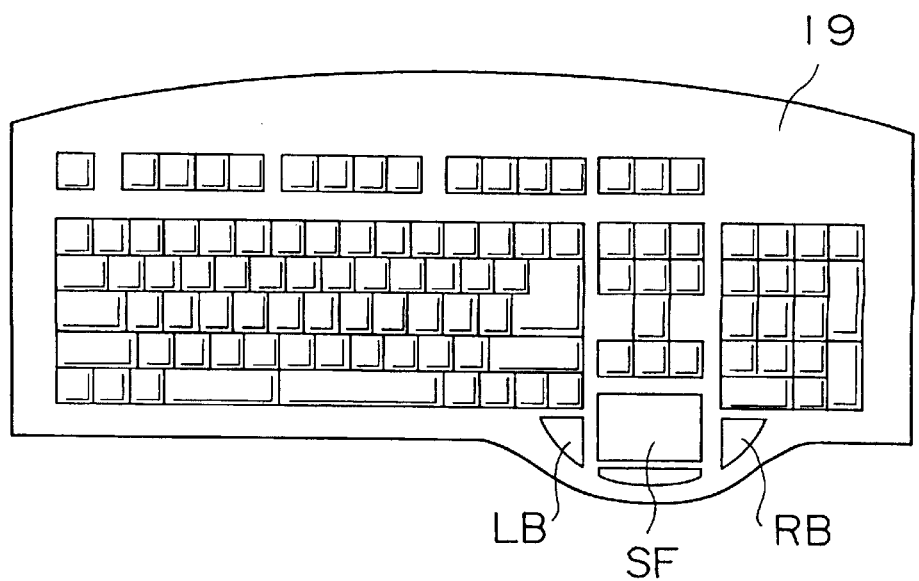
FIG. 3 is a top plan view of a keyboard including a pad built therein, which is used with a coordinate outputting device PC according to the embodiment.

A keyboard 19 is of general type that is usually employed in personal computers, and outputs a key-in signal indicating that a corresponding key is depressed and a key type signal indicating which type of key is depressed. Incidentally, FIG. 3 shows one example of the keyboard 19 in which the coordinate detecting device PD is built.

The operation of the coordinate input system having the above-stated configuration will be described below. For the function of disabling the tap function made during the key input operation, the user can optionally set whether to make that function effective or ineffective. For simplicity of the explanation, it is assumed hereunder that the function of disabling the tap function during the key input operation is always set to be effective. It is also assumed that the flag stored in the mode converter 13 is set to enable the tap function as with a point in time immediately after the coordinate outputting device PC is supplied with power.

In advance, the user sets the above-stated threshold for storing a set value in the measuring unit 14. If there is no problem for the threshold being set to one second as a standard value, the user is not necessarily required to make the setting of the threshold. The setting process can be carried out by the user by, for example, displaying a setting window on the screen. Such a setting process is well known in the art and hence will not be described in detail.

Figure 4:
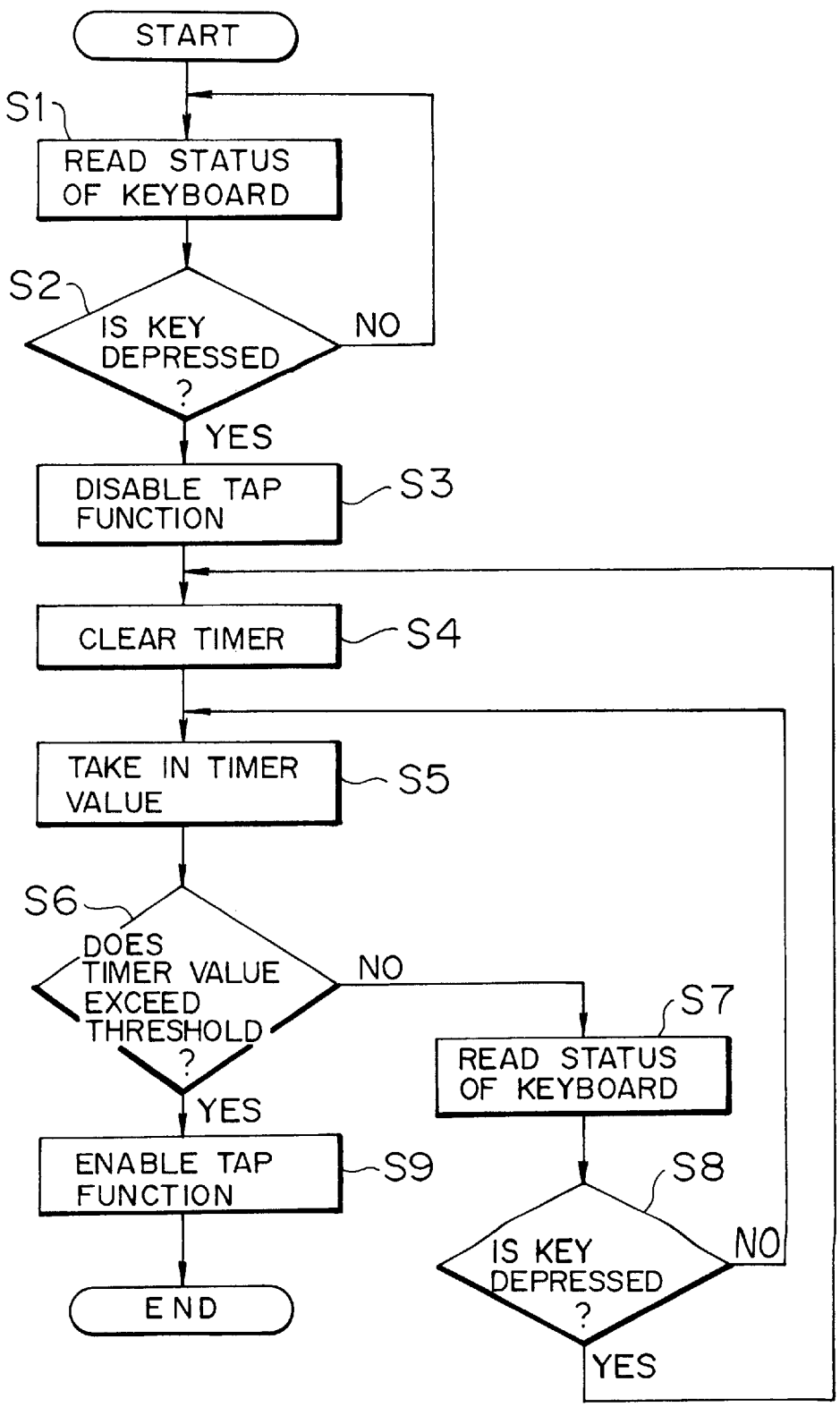
FIG. 4 is a flowchart for explaining operation of the coordinate input system according to the embodiment.

The detailed operation of the coordinate input system will now be described with reference to a flowchart of FIG. 4. First, in step S1, the controller 15 takes the key-in signal and the key type signal from the keyboard 19 into the RAM 18. Then, in step S2, the controller 15 determines based on the key-in signal taken therein whether any key of the keyboard 19 is depressed or not. If the user is not making a key-in action, then the operation returns to step S1 and the processing of steps S1 and S2 is repeated until a key-in action made by the user.

Figure 5:
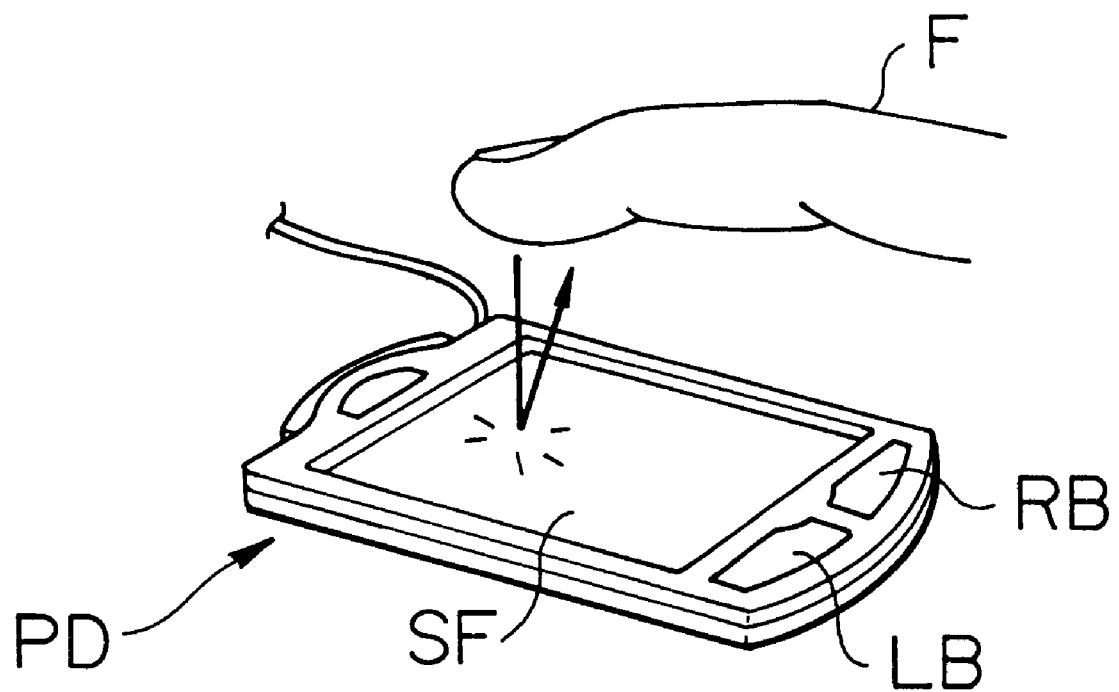
FIG. 5 is an illustration for explaining an operation sequence executed when a user performs a drag action by using the coordinate input system.

If the user makes an action other than the key-in action while the processing of steps S1 and S2 is repeated, then the controller 15 executes operation corresponding to that action. Assume now that the user operates the coordinate detecting device PD and performs a tap action once (i.e., an action of touching the operating surface SF with the finger F and then immediately lifting off the finger F from the operating surface as shown in FIG. 5), the tap action is not ignored by the coordinate outputting device PC and processed duly. In this case, the coordinate input system operates as follows.

First, data is taken into the coordinate outputting device PC from the coordinate detecting device PD. More specifically, in the coordinate detecting device PD shown in FIG. 1, the horizontal scanner 2 and the vertical scanner 3 are driven for scan by driving signals output from the control/drive unit 4. When the user touches the sensor base plate 1 in a desired position with the finger F through the operating surface SF while scan signals are supplied to the respective scan lines on the sensor base plate 1, a serial detection signal corresponding to the operating action of the finger F is output from the vertical scanner 3.

The serial detection signal is converted into a digital signal by the A/D converter 5, and thereafter the tap/slide component extractor 6 extracts tap and slide components from the digital signal. The data processor 7 delivers the tap component directly to the interface 8, and removes noise from the slide component for correction before delivering the slide component to the interface 8. The interface 8 produces tap-on/off information and button-on/off information, adds these items of information to the data sent from the data processor 7, and then supplies them to the output port 9 for delivery to the coordinate outputting device PC.

On the side of the coordinate outputting device PC, the information supplied to the input port 11 is sent to the data analyzer 12 through the interface 10. The process of taking in data from the coordinate detecting device PD into the coordinate outputting device PC is thus completed. Here, if the user makes the tap action once as stated above, the data analyzer 12 detects the tap action from tap-on/off information and informs the detection of the tap action to the controller 15. As a result, the controller 15 emulates the process corresponding to the click action of the left button LB (e.g., the operation of selecting an icon on the screen).

Thus, in the case of the user not entering key inputs through the keyboard 19, when the user makes the tap action, for example, the process corresponding to the tap action is executed in the coordinate outputting device PC.

On the other hand, if the user starts to enter key inputs through the keyboard 19, then the controller 15 detects the key-in action based on the key-in signal and the operation proceeds from step S2 to step S3. In step S3, the controller 15 instructs the mode converter 13 to change the state of the flag so that the tap function is disabled. Therefore, even when the user makes the tap action and the detection of the tap action is informed from the data analyzer 12 after that, the mode converter 13 ignores the detected result and does not transmit it to the controller 15. Accordingly, even if the finger F touches the operating surface SF by mistake during the key input operation, the process corresponding to the tap action is not executed in the coordinate outputting device PC.

After the processing of step S3 is completed, the operation proceeds to step S4 where the controller 15 instructs the measuring unit 14 to clear the timer built therein and then to determine whether a period of time after the clearing of the timer exceeds or not the threshold set by the user. Specifically, the measuring unit 14 takes in a timer value in step S5 and checks in next step S6 whether the timer value exceeds the threshold or not.

At a point in time just after clearing the timer, the timer value does not yet exceed the threshold. Therefore, the operation proceeds to step S7 where the controller 15 reads the status of the keyboard 19 in accordance with the same procedure as in step S1, followed by step S8 where the controller 15 determines whether any key is depressed or not in accordance with the same procedure as in step S2.

If the user now continuously enters key inputs through the keyboard 19, then the determination result in step S8 is "Yes". Therefore, the operation returns to step S4, followed by repeating the processing of steps S4–S8 in the same manner as above.

Thus, while the user continues the key input operation, the timer is cleared in step S4 each time any key is depressed. This means that the determination result in step S6 is in no way "Yes" and the tap function remains disabled. Accordingly, during a period of time in which the user continues entering key inputs, the function of inhibiting the tap function is achieved.

On the other hand, if the user stops entering key inputs through the keyboard 19, then the determination result in step S8 becomes "No". After that, the processing of steps S5–S8 is repeated. Therefore, with the elapse of time, the time value gradually increases and eventually reaches the set threshold. Upon reaching the set threshold, the determination result in step S6 becomes "Yes" and the operation proceeds to step S9 where the controller 15 instructs the mode converter 13 to change the flag state for enabling the tap action. Therefore, when the user makes the tap action after that, the detection result of the tap action is informed from the mode converter 13 to the controller 15, whereupon the process corresponding to the tap action is executed in the coordinate outputting device PC.

As explained above, if a predetermined period of time elapses after the user has stopped entering key inputs, the tap function is automatically switched over from the disabled state to the enabled state. This also provides an advantage of not deteriorating operability of the coordinate detecting device (pad) PD because the coordinate input system is automatically returned to the state of enabling the pad to be operated if the predetermined period of time elapses after the end of the key input operation, while preventing false operation of the coordinate detecting device PD while the key input operation is continued.

The above description has been made on the tap action for the reason that false operation occurred during the key input operation is presumably unintentional contact with the operating surface SF in most cases. It is however supposed that false operation may be caused in any of other various actions, such as a slide action, performed on the coordinate detecting device PD than the tap action. Thus, the present invention is applicable to making ineffective any action performed on the coordinate detecting device PD without being limited to the tap action.

According to the present invention, as described above, screen operation to be made corresponding to an operating action performed on the operating surface of a pad provided near a keyboard is inhibited while key operation through the keyboard is being detected. This provides an advantage of achieving a coordinate input system which can protect work of users under progress against troubles even if the users touch the operating surface of the pad by mistake with a coordinate indicator, e.g., a finger, while the users are operating the keyboard.

According to one preferable form of the present invention, screen operation to be made corresponding to an operating action performed on the operating surface is inhibited from the time when key input operation has been detected, and the screen operation is then resumed after a predetermined period of time elapse from the time when key input operation has no longer been detected after the detection of the key input operation. Therefore, when users stop the key input operation, the screen operation using the operating surface is automatically enabled. This provides an advantage that false action on the operating surface during the key input operation can be made ineffective while keeping the users from being conscious of the process of inhibiting the screen operation.

According to another preferable form of the present invention, since the predetermined period of time from stop of the key input operation to restart of a mode of making effective an action performed on the operating screen is variable by setting from the outside, users can set the predetermined period of time to an optimum value after actually trying the coordinate input system. Another advantage is that with improved skill of typing, users can adjust the predetermined period of time appropriately step by step.

What is claimed is:

1. A keyboard device comprising:
   a keyboard,
   key operation detecting means for detecting key operations produced on said keyboard,
   a coordinate input device arranged near said keyboard and having an operating surface operated by a coordinate indicator,
   operating state detecting means for detecting an operating state of one of a tap and a slide on said operating surface,
   screen operating means operative to perform a screen operation in response to information attained from said key operation detecting means and information attained from said operating state detecting means, and control means for inhibiting said screen operation in response to said screen operation operating on said operating screen while said key operation is being detected, wherein said control means includes a processing means operative to initiate inhibiting of processing of said screen operation in response to said key operation being detected by said key operation detecting means and operative to end said inhibiting of said processing after a predetermined time has after said key operation is no longer detected.

2. The coordinate input system of claim 1, wherein said predetermined period of time is variable by setting from the outside.

3. A keyboard device according to claim 1, wherein said coordinate input device is an electrostatic capacitive-type coordinate input device.

4. A keyboard device according to claim 1, wherein said coordinate input device is a pressure-sensitive type coordinate input device.

5. A method of controlling a keyboard device comprising at least:

a keyboard, key operation detecting means for detecting key operations produced on said keyboard, a coordinate input device arranged near said keyboard and having an operating surface operated by a coordinate indicator, operating state detecting means for detecting an operating state of one of a tap and a slide on said operating surface, screen operating means for performing a screen operation in response to information attained from said key operation detecting means and information attained from said operating state detecting means, and control means operational to inhibit said screen operation in response to said screen operation operating on said operating screen while said key operation is being detected, said method comprising:

inhibiting processing of said screen operation when said key operation is detected, resuming said screen operation corresponding to said operating state on said operating surface after determining that an elapsed time after said key operation is no longer detected is greater than a predetermined time.

* * * * *